April 3, 1956 G. J. KELLY 2,740,600
PARACHUTE RELEASE DEVICE
Filed Oct. 7, 1953
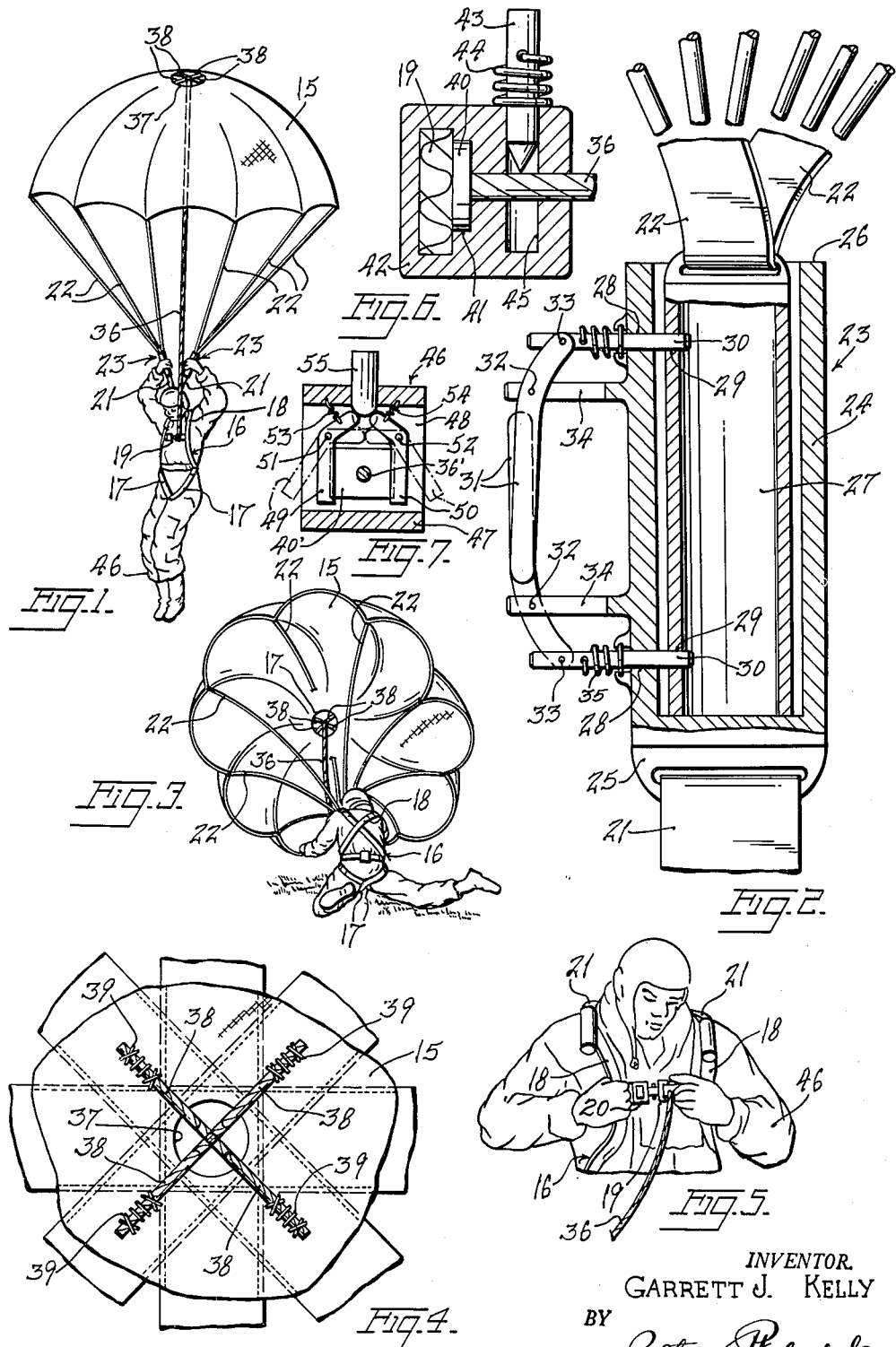
INVENTOR.
GARRETT J. KELLY
BY
ATTORNEY

United States Patent Office 2,740,600
Patented Apr. 3, 1956

2,740,600

PARACHUTE RELEASE DEVICE

Garrett J. Kelly, Astoria, N. Y.

Application October 7, 1953, Serial No. 384,660

2 Claims. (Cl. 244—151)

This invention relates to new and useful improvements in parachutes.

More particularly, the present invention proposes the construction of an improved parachute which will dump its air after landing and turn itself inside out for folding and repacking, and will not drag the jumper over the ground even in the highest wind.

Another object of the present invention proposes forming the parachute with shroud or suspension lines removably attached to the risers on the parachute harness so that the jumper can disengage the canopy from the harness merely by operating conveniently located release mechanism and will not need to struggle out of the harness in the air as is now necessary when coming down in water.

Still further, the present invention proposes constructing the canopy with a central collapse line secured at one end to the center of the canopy and having its other end secured to the harness so that in tree landings where the canopy is entangled, the jumper can use the collapse line for climbing down.

As a further object, the present invention proposes forming the canopy with a central opening and securing the collapse line to the canopy adjacent the opening so that once the shroud or suspension lines are disengaged from the harness, the collapse line will hold the center of the canopy while the wind turns it inside out.

The present invention further proposes arranging the central collapse line so that it is removably attached to the front of the harness and providing means quickly to release it from the harness once the canopy is collapsed.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a jumper using a parachute constructed and arranged in accordance with the present invention.

Fig. 2 is an enlarged view of one of the shroud or suspension line releasing members shown in Fig. 1, parts of the member being broken away and in section.

Fig. 3 is a view similar to Fig. 1 but showing the shroud lines released and the jumper landed with the wind turning the canopy inside out.

Fig. 4 is a fragmentary top plan view of the canopy showing more clearly the central opening in the canopy and the central collapse line secured to the canopy adjacent the central opening.

Fig. 5 is a view similar to Figs. 1 and 3, but showing the jumper releasing the central collapse line after the canopy has been collapsed.

Fig. 6 is a sectional detail view illustrating the central collapse line releasing mechanism shown in Fig. 5.

Fig. 7 is a view similar to Fig. 6, but at right angles thereto and illustrating a modification of the present invention.

Referring more particularly to the drawings, the new parachute has a canopy 15 with a skirt of flexible fabric such as silk, nylon or other parachute canopy materials.

The parachute also has a harness 16 made of cross webbing or the like and having the usual leg straps 17, shoulder fitting portions or straps 18 and chest straps 19. The chest straps 19 are connected together by the usual buckle 20. Risers 21 extend from the shoulder fitting portions 18 of the parachute harness 16.

Spaced shroud or suspension lines 22 extend from the skirt edges of the canopy 15. These peripheral shroud lines 22 are removably secured to the risers 21 by a pair of shroud line releasing members 23.

The shroud line releasing members 23 are identical in construction. Each has a tube 24 (see Fig. 2) secured at one end 25 to one of the risers 21 of the parachute harness 16. This secured end 25 of each tube is closed and the free end 26 is open. An inner tubular member 27 is slidably contained in each tube with the shroud lines 22 being secured to the inner members 27.

Each tube 24 and its inner member 27 have aligning pin receiving openings 28 and 29 and pins 30 removably and slidably extend through these openings 28 and 29.

Levers 31 are mounted on the outside of each tube 24 and are operatively connected in the manner now to be described with the pins 30 to withdraw them from the inner member 27 to release the inner member 27 and the shroud lines 22 attached thereto from the tube 24.

Levers 31 are pivotally secured by pivot pins 32 and 33 to posts 34 on each tube 24 and to the pins 30, respectively. Pins 30 are normally biased inwardly of each tube 24 by tension springs 35 each fastened at one end to one of the pins 30 and at the other end to one of the tubes 24.

A central collapse line 36 is provided to collapse the collapsible canopy 15. One end of the central collapse line 36 is secured at the center of the canopy and the other end is secured to the harness 16. The canopy 15 is provided with a central opening 37 and four lines 38 secured by stitches 39 (see Fig. 4) to the canopy and connected with the central collapse line 36, connecting this central collapse line 36 to the canopy.

The harness connected end of the central collapse line 36 is fixed to a disc 40 (see Fig. 6) held in a recess 41 of a housing 42 against one of the chest straps 19. A knife blade 43 is normally held in retracted position by a spring 44 on housing 42 but is slidably mounted in a recess 45 through which the line 36 extends. Thumb pressure on the knife blade 43 severs the collapse line 36.

By pressing inwardly on the levers 31, the pins 30 are retracted and pulled from the inner members 27. The jumper 46 may do this while in the air shortly before he lands or he can wait until contact with the ground and then release depending on what he is coming down into or onto (see Fig. 1).

After the shroud or suspension lines have been released, the canopy will still be connected to the harness by the collapse line 36 (see Fig. 2). The wind will turn the canopy inside out, collapsing it. Once the canopy has been collapsed, the central collapse line 36 can be severed (see Fig. 5). The shroud line releasing members 23 also provide convenient hand grips for maneuvering the body in descent so that the jumper can land facing in the direction of drift.

The modication of the invention illustrated in Fig. 7 is characterized by the provision of a central collapse line release member 46 having a housing 47 with a central recess 48 in which is pivotally mounted gate members 49 and 50 on pins 51 and 52 respectively. These gate members 49 and 50 form a button release gate removably to hold disc or button 40' which is fixed to the central collapse line 36'. Springs 53 and 54 normally hold the gate in closed position and a plunger 55 slidably mounted in the casing or housing 47 provides means to open the gate by pivoting the gate members 49 and 50 merely by pressing down the plunger.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A parachute comprising a collapsible canopy with a skirt of flexible fabric, a parachute harness having shoulder fitting portions with risers extending therefrom and chest straps, spaced peripheral shroud lines at the edges of the canopy skirt, shroud line releasing means removably to secure the shroud lines to the risers, said canopy having a central opening, a central collapse line with one end secured at the center of the canopy adjacent the central opening therein and the other end releasably secured to one of the chest straps, and a central collapse line release member mounted on said chest strap to release the central collapse line, said central collapse line release member being a manually actuated knife blade slidably mounted on the chest strap.

2. A parachute comprising a collapsible canopy with a skirt of flexible fabric, a parachute harness having shoulder fitting portions with risers extending therefrom and chest straps, spaced peripheral shroud lines at the edges of the canopy skirt, shroud line releasing means removably to secure the shroud lines to the risers, said canopy having a central opening, a central collapse line with one end secured at the center of the canopy adjacent the central opening therein and the other end releasably secured to one of the chest straps, and a central collapse line release member mounted on said chest strap to release the central collapse line, said central collapse line release member including a manually operated gate pivotally mounted in a casing slidably mounted on the chest strap, a button secured to said releasable end of the central collapse line releasably secured to one of the chest straps, said button being held in said casing by said button release gate.

References Cited in the file of this patent

UNITED STATES PATENTS

| | | |
|---|---|---|
| 1,284,455 | Reinsdorf | Nov. 12, 1918 |
| 2,328,914 | Kubat | Sept. 7, 1943 |
| 2,581,557 | Rozas | Jan. 8, 1952 |

FOREIGN PATENTS

| | | |
|---|---|---|
| 13,553 | Great Britain | of 1903 |
| 155,041 | Great Britain | Dec. 16, 1920 |
| 695,255 | Great Britain | Aug. 5, 1953 |
| 713,931 | Germany | Nov. 21, 1941 |
| 827,946 | France | Feb. 2, 1938 |
| 896,186 | France | Apr. 24, 1944 |